(12) United States Patent
Lubben et al.

(10) Patent No.: US 10,207,581 B2
(45) Date of Patent: Feb. 19, 2019

(54) MULTI-MODE POWERTRAIN FOR WORK VEHICLE PROVIDING SELECTIVE POWER DISTRIBUTION BETWEEN AXLES

(71) Applicant: Deere & Company, Moline, IL (US)

(72) Inventors: Jeffrey L. Lubben, Hudson, IA (US); Mark W. Freudenberg, Cedar Falls, IA (US); Viresh Hitanalli, Pune (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/409,879

(22) Filed: Jan. 19, 2017

(65) Prior Publication Data

US 2018/0201127 A1 Jul. 19, 2018

(51) Int. Cl.
| | | |
|---|---|---|
| F16H 3/66 | (2006.01) |
| B60K 17/346 | (2006.01) |
| F16H 37/08 | (2006.01) |
| F16H 61/00 | (2006.01) |

(52) U.S. Cl.
CPC .............. B60K 17/346 (2013.01); F16H 3/66 (2013.01); F16H 37/0813 (2013.01); F16H 61/0059 (2013.01); F16H 2200/0017 (2013.01); F16H 2200/0034 (2013.01); F16H 2200/2005 (2013.01); F16H 2200/2038 (2013.01)

(58) Field of Classification Search
CPC .................................................... B60K 17/346
USPC ........................................................ 180/249
See application file for complete search history.

(56) References Cited

U.S. PATENT DOCUMENTS

| | | | |
|---|---|---|---|
| 5,301,769 A | 4/1994 | Weiss | |
| 9,108,511 B2 * | 8/2015 | Janson | ................... B60K 23/08 |
| 2002/0060103 A1 | 5/2002 | Ritz et al. | |

FOREIGN PATENT DOCUMENTS

| | | |
|---|---|---|
| DE | 100 29 819 C1 | 5/2002 |
| DE | 10 2014 206 489 A1 | 10/2014 |

OTHER PUBLICATIONS

Search Report issued for DE 10 2017 220 667.5 dated Aug. 3, 2018, 12 pages.

* cited by examiner

*Primary Examiner* — Derek D Knight
(74) *Attorney, Agent, or Firm* — Klintworth & Rozenblat IP LLP

(57) ABSTRACT

A work vehicle includes a multi-mode power distribution assembly that selectively distributes power from a drive shaft between a first axle and a second axle. The power distribution assembly includes a plurality of clutches, each moveable between an engaged position and a disengaged position. The power distribution assembly includes a first mode, a second mode, and a third mode. In some embodiments, the first mode may be a four-wheel drive mode, the second mode may be an all-wheel drive mode, and the third mode may be an overdrive mode. Also, a park mode may be provided, wherein the clutches are in the engaged position.

20 Claims, 5 Drawing Sheets

MULTI-MODE POWERTRAIN FOR WORK VEHICLE PROVIDING SELECTIVE POWER DISTRIBUTION BETWEEN AXLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a multi-mode powertrain and, more particularly, to a multi-mode powertrain for a work vehicle that is configured to provide selective power distribution between multiple axles.

BACKGROUND OF THE DISCLOSURE

Work vehicles may be intended for work in a variety of conditions. For example, tractors and other work vehicles are often driven on muddy, icy, or otherwise low-traction ground surfaces at low speeds. The same work vehicles may, at other times, be driven on paved roads, hard-packed ground surfaces, or otherwise high-traction ground surfaces at higher speeds. In some cases, the powertrain of the work vehicle may be effective for driving in one condition but may be less effective in another condition. More specifically, limitations in the powertrain may cause the wheels to lose traction in some conditions, and/or inefficiencies of the powertrain may degrade fuel economy for the work vehicle in other conditions.

Also, many powertrains may be relatively complex and/or may include a large number of parts. As such, the powertrain may take up a large amount of space, may increase the weight of the vehicle, and may be difficult to manufacture and assemble.

SUMMARY OF THE DISCLOSURE

This disclosure provides a multi-mode power distribution assembly for a work vehicle.

In one aspect, the disclosure provides a work vehicle that includes a power plant configured to generate power for rotating a drive shaft, a first axle, and a second axle. The work vehicle further includes a power distribution assembly having a plurality of modes. The power distribution assembly is configured to selectively distribute power from the drive shaft between the first axle and the second axle in the plurality of modes. The power distribution assembly includes a plurality of clutches, each moveable between an engaged position and a disengaged position. The plurality of clutches includes at least one clutch that is configured to change between the respective engaged position and the respective disengaged position to selectively change the power distribution assembly between the plurality of modes. The power distribution assembly also includes a planetary gearset including a first component, a second component, and a third component. The plurality of modes includes a first mode, a second mode, and a third mode. In the first mode, power from the drive shaft is configured to be input to the first component and transferred to the second and third components for transmission to the first axle and the second axle. The first and second axles are fixed together for rotation at fixed speed ratio in the first mode. In the second mode, power from the drive shaft is configured to be input to the first component and is divided between the second and third components for delivery to the first axle and the second axle. The first and second axles are configured for rotation at a varying speed ratio in the second mode. In the third mode, power from the drive shaft is configured to be input via an input member to the first component, is output to the first axle via the second component, and is prevented from transferring to the second axle via the third component. In the third mode, an input speed of the input member is less than an output speed of the second axle.

In another aspect, the disclosure provides a method of operating a multi-mode power distribution assembly that includes a plurality of clutches and a planetary gearset. The clutches are independently moveable between an engaged position and a disengaged position. The planetary gears include a first component, a second component, and a third component. The method includes changing the power distribution assembly between a first mode, a second mode, and a third mode by moving at least one of the plurality of clutches between the engaged position and the disengaged position. The method also includes operating the power distribution assembly in the first mode with power from a drive shaft being input to the first component and transferred to the second and third components for transmission to a first axle and a second axle. The first and second axles are fixed together for rotation at fixed speed ratio in the first mode. The method also includes operating the power distribution assembly in the second mode with power from the drive shaft being input to the first component and divided between the second and third components for delivery to the first axle and the second axle. The first and second axles are configured for rotation at a varying speed ratio in the second mode. The method additionally includes operating the power distribution assembly in the third mode with power from the drive shaft being input to an input member of the power distribution assembly for rotating the first component and being output to the first axle via the second component. The power from the drive shaft is prevented from transferring to the second axle via the third component in the third mode. An input speed of the input member is less than an output speed of the second axle in the third mode.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
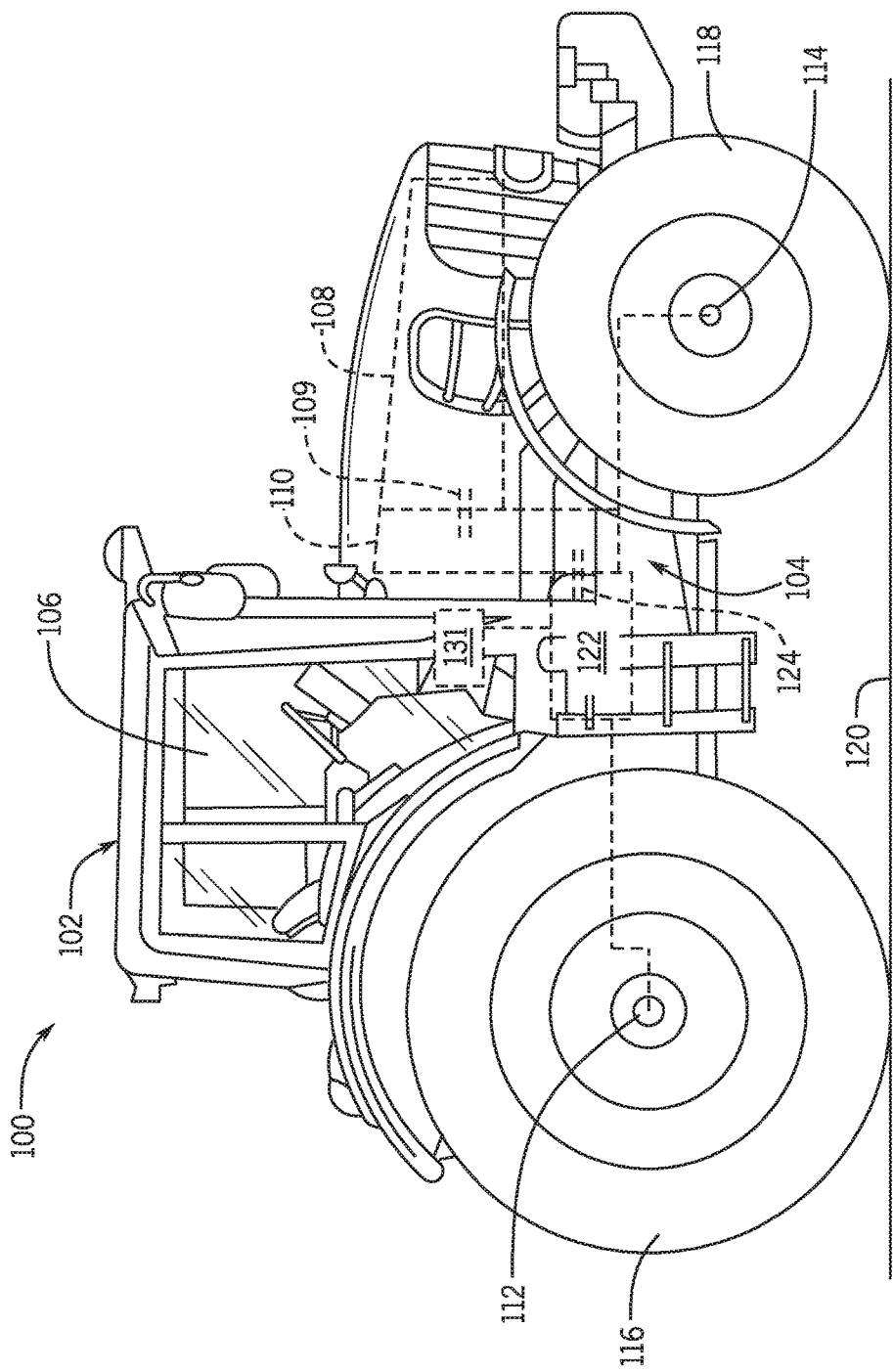
FIG. 1 is a side view of a work vehicle with a power distribution assembly of the present disclosure shown schematically.

The following describes one or more example embodiments of the disclosed power distribution assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "aft," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

For convenience of notation, "component" may be used herein, particularly in the context of a planetary gear set, to indicate an element for transmission of power, such as a sun gear, a ring gear, or a plurality of planet gears connected by a carrier. Also, the term "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

Additionally, different rotatable parts (e.g., gears, shafts, clutch members, etc.) will be discussed. For convenience of notation, two rotatable parts will be deemed "fixed together for rotation," "rotationally fixed," and the like if those parts are attached together to rotate as a unit at a fixed speed ratio (e.g., a fixed 1:1 ratio or a different fixed ratio). Also, two rotatable parts will be deemed "coupled together for rotation," "coupled for rotation," and the like if those parts are attached to rotate together, but not necessarily at a fixed speed ratio.

The following describes one or more example implementations of a power distribution assembly for a work vehicle, as shown in the accompanying figures. The disclosed power distribution assembly, its method of operation, and the different work vehicles associated therewith provide selective transmission of power between multiple axles of the work vehicle. The power distribution assembly has multiple modes for different work and travel conditions, as compared to conventional systems. By changing between different modes, power and torque may flow along different paths through the assembly for delivery to one or more of the axles. Also, at least one mode may provide increased fuel economy as compared to conventional systems. Additionally, the power distribution assembly may be relatively compact and may have a relatively low part count. Accordingly, the assembly may provide certain manufacturing efficiencies.

Generally, the work vehicle may include a power plant, such as an engine that generates power and that rotates a drive shaft. Power from the drive shaft may be directed to the power distribution assembly. The power distribution assembly may include a plurality of clutches. The clutches may be moveable between an engaged position and a disengaged position. By changing at least one clutch between its engaged position and its disengaged position, the mode of the power distribution assembly may be changed. Furthermore, the power distribution assembly may include a planetary gearset. Power flowing from the drive shaft may be distributed through the planetary gearset in a variety of ways for transfer to a rear axle and/or a front axle of the work vehicle, depending on the current mode setting.

In some embodiments, one mode of the power distribution assembly may, in effect, fix a front axle and a rear axle together for rotation such that power from the drive shaft rotates the front and rear axles together at a fixed speed ratio. This first mode may define a four-wheel drive mode in some embodiments. Additionally, another mode may allow power to transfer from the drive shaft to the front axle and the rear axle, but at a varying speed ratio. This second mode may define an all-wheel drive mode in some embodiments. Furthermore, in some embodiments, another mode may allow power from the drive shaft to transfer to one of the axles only, wherein input speed to the power distribution assembly is less than the output speed from the power distribution assembly (i.e., an overdrive mode).

Moreover, in some embodiments, the power distribution assembly may provide a park mode for the work vehicle. In some embodiments, the park mode may be achieved by engaging each of the clutches. In this regard, the clutches may be biased toward the engaged position. Thus, to enter park mode, forces used to disengage the clutches may be reduced, allowing the biasing forces to engage the clutches and parking the vehicle.

These features may provide a high degree of versatility for the work vehicle. For example, the different modes may allow the work vehicle to function effectively in a variety of work conditions. Also, at least one mode may increase fuel economy for the work vehicle. Additionally, the power distribution assembly may be relatively compact and/or the part count may be relatively low.

With reference to the drawings, one or more example implementations of a work vehicle with a power distribution assembly for distributing power between a first axle and a second axle will now be described. While a tractor is illustrated and described herein as an example work vehicle, one skilled in the art will recognize that principles of the power distribution assembly and its method of operation may be readily adapted for use in other types of work vehicles.

FIG. 1 illustrates a work vehicle 100, such as a tractor 102, with a chassis 104, and an operator cabin 106 supported by the chassis 104. The work vehicle 100 further includes a powerplant, such as an engine 108, which is represented schematically in both FIGS. 1 and 2.

In some embodiments, the engine 108 may be an internal combustion engine 108, such as a diesel engine for generating mechanical energy and rotating a drive shaft 109. In other embodiments, the powerplant of the vehicle 100 may include an electric motor instead of the engine 108. In additional embodiments, the vehicle 100 may include multiple power plants (e.g., an I/C engine with an operably attached electric motor) that rotate the drive shaft 109.

The drive shaft 109 may be operably connected to a transmission 110. The transmission 110 may include a transmission shaft 124. The transmission 110 may include a gearbox with a plurality of gears arranged in at least one geartrain that extends between the drive shaft 109 and the transmission shaft 124 and that applies a predetermined gear ratio when transmitting power transmitted from the engine 108. Accordingly, rotational power and torque from the rotating drive shaft 109 may be input to the transmission 110, the transmission 110 may apply the predetermined gear ratio, and the transmission 110 may output the power via the transmission shaft 124.

Figure 2:
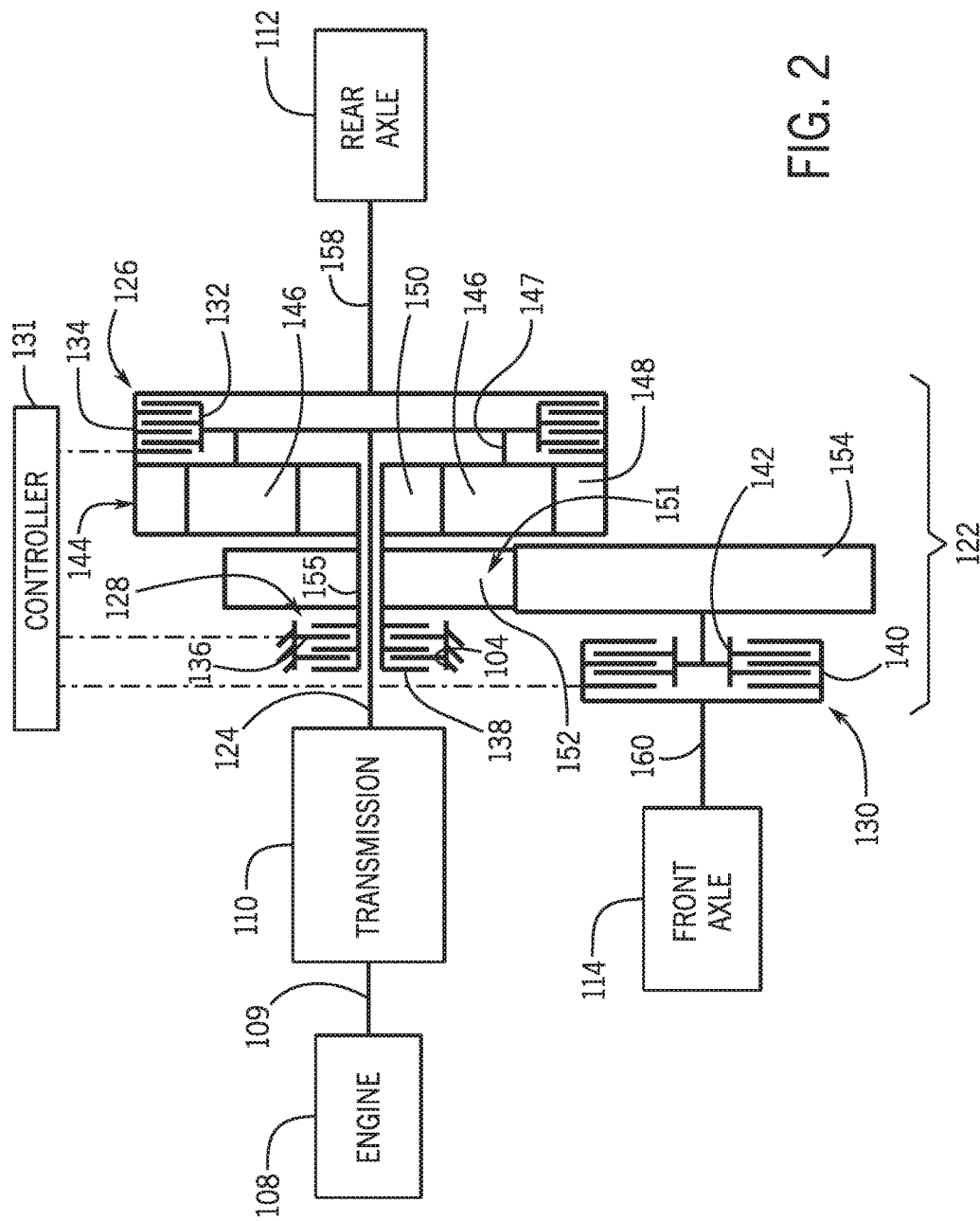
FIG. 2 is a schematic view of the power distribution assembly according to an example embodiment of the present disclosure.

The vehicle 100 may additionally include a rear axle 112 and a front axle 114. A plurality of rear wheels 116 (one of which is shown in FIG. 1) may be mounted on the rear axle 112. A plurality of front wheels 118 (one of which is shown in FIG. 1) may be mounted on the front axle 114. In FIG. 2, the rear axle 112 and front axle 114 are represented schematically. The wheels 116, 118 may provide traction on a ground surface 120. In some embodiments, the front axle 114 and front wheels 118 may be steerable relative to the chassis 104 (i.e., configured to turn for steering the vehicle 100 during travel along the ground surface 120).

Moreover, the work vehicle 100 may include a power distribution assembly 122. The power distribution assembly 122 may include various gears, shafts, and other features, which will be discussed in detail below according to example embodiments. Generally, the power distribution assembly 122 may receive power generated by the engine 108 and distribute that power between the rear axle 112 and the front axle 114. The power distribution assembly 122 may have a plurality of different modes. The power distribution assembly 122 may distribute power between the rear and front axles 112, 114 differently, depending on the current mode of the power distribution assembly 122. Accordingly, the power distribution assembly 122 may provide selective power distribution between the rear and front axles 112, 114.

In some embodiments, the power distribution assembly 122 may include a plurality of clutches. In the embodiment of FIG. 2, for example, the power distribution assembly 122 may include a first clutch 126, a second clutch 128, and a third clutch 130. In the illustrated embodiment, the first clutch 126 may be referred to as a "direct clutch," the second clutch 128 may be referred to as an overdrive (O/D) clutch, and the third clutch 130 may be referred to as a mechanical front wheel drive (MFWD) clutch.

Each clutch 126, 128, 130 may include a plurality of members (e.g., alternatingly arranged clutch plates, friction plates, etc.) that are configured to engage and, alternately, disengage. When these members are engaged (i.e., the clutch is in the engaged position), power and torque may transmit through the clutch. Conversely, when these members are disengaged (i.e., the clutch is in the disengaged position), power and torque may be prevented from transmitting through the clutch.

The clutches 126, 128, 130 may be actuated (between the engaged and disengaged positions) in any suitable fashion. For example, the clutches 126, 128, 130 may be hydraulically actuated, pneumatically actuated, actuated by an electric motor, or otherwise actuated.

In some embodiments, one or more of the clutches 126, 128, 130 may be biased toward the engaged position, and the clutch(es) may be positively actuated for disengagement. In some embodiments, for example, each of the clutches 126, 128, 130 may be spring biased toward the engaged position, and may be individually actuated (via hydraulics, pneumatics, motors, etc.) to move the clutches 126, 128, 130 to the respective disengaged position against the biasing force.

As will be discussed, the plurality of clutches 126, 128, 130 may collectively define a plurality of clutch arrangements. In one clutch arrangement, some of the clutches 126, 128, 130 may be engaged while others are disengaged, and to change the clutch arrangement, at least one clutch is changed between its respective engaged position and its respective disengaged position. By changing the clutch arrangement, the mode of the power distribution assembly 122 may be selectively changed as will be discussed in more detail below.

The vehicle 100 may additionally include a control system 131. The control system 131 may be configured for controlling various components of the vehicle 100. For example, the control system 131 may be configured for controlling actuation of the clutches 126, 128, 130. In the case of hydraulically actuated clutches 126, 128, 130, the control system 131 may be in communication with one or more pumps, and flow from the pumps may be routed through various control valves via various conduits (e.g., flexible hoses) in order to actuate the clutches 126, 128, 130. In additional embodiments, the control system 131 may be configured as a computing device with associated processor devices and memory architectures, as a hard-wired computing circuit (or circuits), as a programmable circuit, as a hydraulic, electrical or electro-hydraulic controller, or otherwise. As such, the control system 131 may be configured to execute various computational and control functionality with respect to the clutches 126, 128, 130. In some embodiments, the control system 131 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the control system 131 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements. The control system 131 may, thus, send control signals to the actuators for changing and controlling the position of the clutches 126, 128, 130. In other words, the control system 131 may control whether one or more of the clutches 126, 128, 130 is in the respective engaged position or in the respective disengaged position.

It will be appreciated that the control system 131 may also send control signals to the engine 108, an accelerator, a braking system, and the like for changing the velocity of the vehicle 100. Moreover, the control system 131 may send control signals to a steering system associated, for example, with the front axle 114 and front wheels 118 for changing the steering direction of the vehicle 100.

The control system 131 may be in electronic, hydraulic, mechanical, or other communication with the clutches 126, 128, 130 and/or other systems or devices of the vehicle 100. The control system 131 may communicate with other systems or devices of the vehicle 100 in various known ways, including via a CAN bus (not shown) of the vehicle 100, via wireless communication, hydraulic communication means, or otherwise.

The power distribution assembly 122 may include one or more geartrains configured to provide different power flow paths to the rear axle 112 and front axle 114. For example, in some embodiments, the power distribution assembly 122 may include a planetary gearset 144 with a first component, a second component, and a third component. More specifically, in some embodiments, the planetary gearset 144 may be embodied by a single planetary gearset that includes a plurality of planet gears 146 attached by a carrier 147, a ring gear 148, and a sun gear 150. It will be appreciated that the planet gears 146 may be disposed between the ring gear 148 and the sun gear 150 and may be enmeshed with both. The planetary gearset 144 may have a variety of configurations, gear ratios, dimensions, etc. without departing from the scope of the present disclosure.

In some embodiments, the carrier 147 (and thus, the planet gears 146) may be fixed to the transmission shaft 124 for rotation therewith. Also, the carrier 147 may be fixed for rotation with first members 132 (e.g., first clutch plates, friction plates, etc.) of the first clutch 126. Accordingly, in some embodiments, the transmission shaft 124, the carrier 147 and the first members 132 of the first clutch 126 may be fixed together to rotate as a unit about a common axis (e.g., the axis of the transmission shaft 124)

Additionally, second members 134 (e.g., second clutch plates, friction plates, etc.) of the first clutch 126 may be fixed to the ring gear 148. The second members 134 may additionally be fixed for rotation with a rear axle shaft 158, which is coupled to the rear axle 112. Accordingly, in some embodiments, the ring gear 148, the rear axle shaft 158, and the second members 134 of the first clutch 126 may be fixed together to rotate as a unit about a common axis (e.g., the axis of the ring gear 148).

The sun gear 150 may be fixed to first members 138 (e.g., first clutch plates, friction plates, etc.) of the second clutch 128. Accordingly, the sun gear 150 and the first members 138 may rotate as a unit about a common axis (e.g., the axis of the sun gear 150). Additionally, second members 136 (e.g., second clutch plates, friction plates, etc.) of the second clutch 128 may be fixed relative to the chassis 104 of the vehicle 100 and grounded thereto.

The power distribution assembly 122 may further include one or more intermediate gears that are coupled with the planetary gearset 144. In some embodiments, the intermediate gear(s) may be arranged in an intermediate geartrain 151. One or more gears of the intermediate geartrain 151 may be configured as idler gears that transfer power input from the planetary gearset 144 to one of the axles 112, 114. In the embodiment of FIG. 2, for example, the intermediate geartrain 151 may transfer power input from the planetary gearset 144 to the front axle 114.

In some embodiments, the intermediate geartrain 151 may include a first intermediate gear 152. The first intermediate gear 152 may be fixed to the sun gear 150 for rotation therewith. In some embodiments, the first intermediate gear 152 may be co-axial with and disposed on a common shaft 155 with the sun gear 150 and the first members 138 of the second clutch 128. In the embodiment of FIG. 2, for example, the intermediate gear 152 may be disposed between the sun gear 150 and the first members 138 along the axis of the common shaft 155.

The intermediate geartrain 151 may further include a second intermediate gear 154. The axis of the second intermediate gear 154 may be substantially parallel with, but spaced apart from the axis of the first intermediate gear 152. The second intermediate gear 154 may be enmeshed with the first intermediate gear 152. The second intermediate gear 154 may be fixed to first members 142 (e.g., first clutch plates, friction plates, etc.) of the third clutch 130. As such, the second intermediate gear 154 may rotate as a unit with the first members 142 about a common axis (e.g., the axis of the second intermediate gear 154.

The third clutch 130 may additionally include second members 140 (e.g., second clutch plates, friction plates, etc.). The second members 140 may be fixed to a front axle shaft 160. In some embodiments, the front axle shaft 160 may be connected to the front axle 114. In some embodiments, the second intermediate gear 154 may be coupled with the front axle shaft 160 for rotation therewith. In some embodiments, the third clutch 130 may allow the second intermediate gear 154 and the front axle shaft 160 to selectively couple to and uncouple from the front axle shaft 160.

It will be appreciated that the intermediate geartrain 151 may provide a predetermined gear ratio and/or gear reduction for torque and power transfer between the planetary gearset 144 and the front axle 114. Similarly, the planetary gearset 144 may provide a predetermined gear ratio and/or gear reduction for torque and power transfer through the planetary gearset 144. These gear ratios may be of any suitable value without departing from the scope of the present disclosure.

As mentioned, the first clutch 126 may have an engaged position in which the first and second members 132, 134 are engaged and fixed together for rotation. This causes the ring gear 148 and the rear axle shaft 158 to be rotationally coupled for rotation as a unit (i.e., at the same rotational speed) about the axis of the shaft 158. The first clutch 126 may additionally have a disengaged position, in which the first and second members 132, 134 are disengaged. This allows the ring gear 148 and the rear axle shaft 158 to release, decouple, and allow independent rotation of the ring gear 148 and rear axle shaft 158.

Furthermore, the second clutch 128 may have an engaged position in which the first and second members 136, 138 are engaged. This causes the sun gear 150 to be grounded and fixed to the chassis 104 of the vehicle 100. The second clutch 128 may additionally have a disengaged position, in which the first and second members 136, 138 are disengaged. This allows the sun gear 150 to be released from the chassis 104 for rotation relative to the chassis 104.

Additionally, the third clutch 130 may have an engaged position in which the first and second members 140, 142 are engaged. This causes the second intermediate gear 154 and the front axle shaft 160 to be fixed for rotation as a unit about the axis of the front axle shaft 160. The third clutch 130 may additionally have a disengaged position, in which the first and second members 140, 142 are disengaged. This allows the second intermediate gear 154 and the front axle shaft 160 to decouple and allow independent rotation of the second intermediate gear 154 and the front axle shaft 160.

The power distribution assembly 122 may have a plurality of modes. At least two of these modes may be drive modes for transmitting and power from the engine 108 to the rear axle 112 and/or the front axle 114. In some embodiments, the power distribution assembly 122 may further include a park mode, which renders the rear axle 112 and/or the front axle 114 stationary.

The modes of the power distribution assembly 122 may be controlled by the control system 131. More specifically, the control system 131 may provide control signals for changing one or more of the clutches 126, 128, 130 between its respective engaged position and its respective disengaged position for changing the mode of the power distribution assembly 122.

Figure 5:
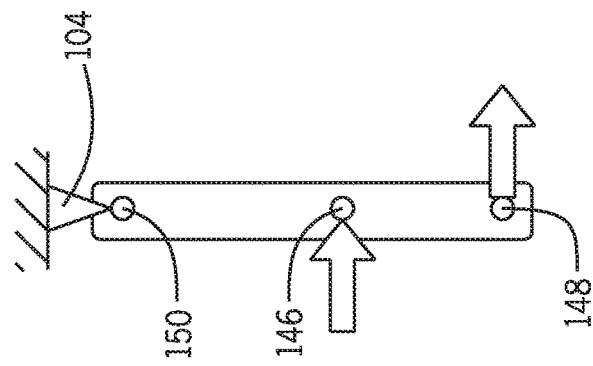
FIG. 5 is a schematic view representing power flow through the power distribution assembly of FIG. 2 in a third transmission mode.
Figure 4:
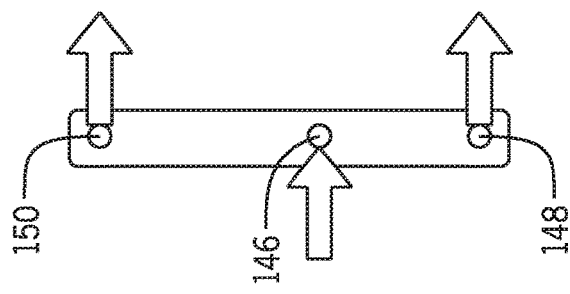
FIG. 4 is a schematic view representing power flow through the power distribution assembly of FIG. 2 in a second transmission mode.
Figure 3:
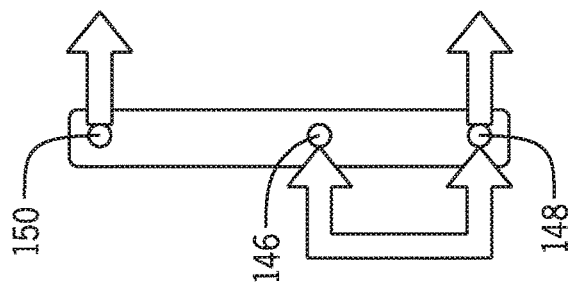
FIG. 3 is a schematic view representing power flow through the power distribution assembly of FIG. 2 in a first transmission mode.

Power may flow through the planetary gearset 144 along different paths in different modes as illustrated in FIGS. 3, 4, and 5. FIG. 3 may represent power flow through the planetary gearset 144 in a first mode, which will be discussed in detail below. FIG. 4 may represent a second mode, and FIG. 5 may represent a third mode, each of which will be discussed in detail. It will be appreciated that the planet gears are indicated at 146, the ring gear is indicated at 148, and the sun gear is indicated at 150 in FIGS. 3-5. It will also be appreciated that, in FIGS. 3-5, the vertical distance between the planet gears 146 and the ring gear 148 indicates the number of gear teeth and the associated gear ratio between the planet gears 146 and the ring gear 148. Likewise, the vertical distance between the planet gears 146 and the sun gear 150 indicates the number of gear teeth and the associated gear ratio between the planet gears 146 and the sun gear 150.

In some embodiments, the power distribution assembly 122 may include the first mode represented in FIGS. 2 and 3. This mode may be referred to as a "four-wheel drive (4WD) mode." In this mode, the first clutch 126 may be in the engaged position, the second clutch 128 may be in the disengaged position, and the third clutch 130 may be in the engaged position. This may, in effect, lock (i.e., rotationally fix) the rear axle 112 and front axle 114 together for rotation according to a fixed speed ratio. More specifically, power from the engine 108 may transmit through the transmission 110 and to the carrier 147 and planet gears 146 of the planetary gearset 144. The ring gear 148 may be fixed for rotation with the carrier 147 and planet gears 146. Accordingly, power and torque may be transferred to the rear axle shaft 158 and the rear axle 112 via the ring gear 148. Likewise, power may flow from the planet gears 146 to rotate the sun gear 150 and, in turn, the gears 152, 154 of the intermediate geartrain 151. Accordingly, power may be transferred to the front axle shaft 160 and the front axle 114 via rotation of the second intermediate gear 154. In some embodiments, the rear and front axles 112, 114 may receive constant torque in this first mode of the power distribution assembly 122. Additionally, the power distribution assembly 122 may be configured (e.g., due to one or more gear ratios) to provide a fixed speed ratio between the rear and front axles 112, 114 in this first mode. For example, in some embodiments, the power distribution assembly 122 may be geared to cause the front axle 114 to rotate faster than the rear axle 112. This fixed, unequal speed ratio may improve the steering capabilities of the front axle 114. This first mode may be useful for providing traction even when the ground surface 120 is relatively slippery (low coefficient of friction ground surface 120). Also, the first mode may be useful for heavy tillage operations (e.g., use of scraper, ripper, moldboard plowing, etc.), for turning at headlands, and/or in other situations.

Additionally, in some embodiments, the power distribution assembly 122 may include the second mode represented in FIGS. 2 and 4. This mode may be referred to as an "all-wheel drive (AWD) mode." In this mode, the first clutch 126 may be in the disengaged position, the second clutch 128 may be in the disengaged position, and the third clutch 130 may be in the engaged position. This may, in effect, provide a differential between the rear axle 112 and front axle 114 and allow the axles 112, 114 to rotate according to varying speed ratios. More specifically, power from the engine 108 may transmit through the transmission 110 and to the carrier 147 and planet gears 146 of the planetary gearset 144. The ring gear 148 may be fixed for rotation with the carrier 147 and planet gears 146. Accordingly, power and torque may be transferred to the rear axle shaft 158 and the rear axle 112 via the ring gear 148. Likewise, power may flow from the planet gears 146 to rotate the sun gear 150 and, in turn, the gears 152, 154 of the intermediate geartrain 151. Accordingly, power may be transferred to the front axle shaft 160 and the front axle 114 via rotation of the second intermediate gear 154. It will be appreciated that power from the engine 108 may be split and divided between the sun gear 150 and the ring gear 148. The torque may be split according to the available traction for each wheel 116, 118 against the ground 120. The second mode may be useful for light-to-medium field work including baling, planting, mowing, cutting, manure spreading, light tillage, or light loader work. Furthermore, the second mode may be useful for higher speed transport of the vehicle 100 when the ground surface 120 is slippery. Additionally, in the second mode, the power distribution assembly 122 may bias torque toward the rear axle 112. Specifically, in some embodiments, the gear ratio between the ring gear 148 and the sun gear 150 may cause torque to be biased toward the rear axle 112. For example, in some embodiments, 40% of the torque may be delivered to the front axle 114 while 60% of the torque may be delivered to the rear axle 112.

The power distribution assembly 122 may further include the third mode represented in FIGS. 2 and 5. This mode may be referred to as an "overdrive mode." In this mode, the first clutch 126 may be in the disengaged position, the second clutch 128 may be in the engaged position, and the third clutch 130 may be in the disengaged position. This may, in effect, allow power to be delivered to the rear axle 112 and prevent power from being delivered to the front axle 114. More specifically, power from the engine 108 may transmit through the transmission 110 and to the carrier 147 and planet gears 146 of the planetary gearset 144. The sun gear 150 may be grounded to the chassis 104 (i.e., locked in a fixed position) due to the engaged second clutch 128. Accordingly, power and torque may transmit from the planet gears 146, through the ring gear 148 and ultimately to the rear axle shaft 158 and the rear axle 112. The gear ratio of the planetary gearset 144 may be such that the output speed of the rear axle shaft 158 is greater than the input speed of the transmission shaft 124. For example, in some embodiments, the gear ratio through the power distribution assembly 122 may be between approximately 0.7 to approximately 0.8 to provide overdrive. This third mode may be useful for driving the vehicle 100 at relatively high ground speeds, when the ground surface 120 provides relatively high traction (i.e., high coefficient of friction). Thus, the third mode may be useful for transport, for driving on road surfaces, and the like. Additionally, the overdrive of the third mode may allow the engine 108 to have a lower engine speed at peak vehicle speeds, thereby improving fuel efficiency and reducing engine noise.

Furthermore, the power distribution assembly 122 may provide a park mode for the vehicle 100. The park mode may lock up the rear axle 112 and/or the front axle 114 so that the vehicle 100 remains stationary relative to the ground surface 120. In some embodiments, the park mode may be provided by one or more of the clutches 126, 128, 130. For example, in some embodiments, the park mode may be provided when the first clutch 126 is in the engaged position, the second clutch 128 is in the engaged position, and the third clutch 130 is in the engaged position. Accordingly, the rear axle 112 and the front axle 114 may be fixed relative to the chassis 104. Thus, the clutches 126, 128, 130 may have various arrangements for providing the different modes of the power distribution assembly 122 as discussed above, and the clutches 126, 128, 130 may have another arrangement for providing the park mode. As such, a separate parking clutch, brake, and/or pawl may not be necessary. As a result, the power distribution system 122 may be relatively compact, may have a relatively low part count, and/or may provide manufacturing efficiencies.

Additionally, the power distribution system 122 may provide advantages related to shifting between the different modes. For example, when shifting between the first mode (4WD mode) and the second mode (AWD mode), only one clutch need be changed between its respective engaged and disengaged position. Specifically, when shifting from the first mode (4WD mode) to the second mode (AWD mode), the first clutch 126 is moved from its engaged position to its disengaged mode, the second clutch 128 remains in its disengaged position, and the third clutch 130 remains in its engaged position. In contrast, when shifting from the second mode (AWD mode) to the first mode (4WD mode), the first clutch 126 may be moved from its disengaged position toward the engaged position. The other clutches may remain in the same position. Accordingly, these shifts between the first mode and the second mode may be achieved seamlessly and in manner that is imperceptible by the operator.

In some embodiments, the power distribution assembly 122 may be in the second, AWD mode. The control system 131 may be configured for detecting wheel slip or differential speed between the rear and front axles 112, 114. If the control system 131 detects either condition, the control system 131 may provide a control signal to move the first clutch 126 from the disengaged position to the engaged position. Thus, the rear and front axles 112, 114 (and the rear wheels 116, 118) may be locked together for maximum traction in slippery conditions. Conversely, the control system 131 may provide a control signal for actuating and disengaging the first clutch 126, for example, when a predetermined speed threshold is achieved on the road or on the field.

Moreover, a shift to the third, overdrive mode may be achieved typically from the second, AWD mode. Specifically, the second clutch 128 may be moved from the disengaged position to the engaged position and the third clutch 130 may be moved from the engaged position to the disengaged position.

Shifting to park mode may be relatively simple, especially considering that the vehicle 100 would likely be stationary relative to the ground surface 120 (i.e., ground speed of zero). For example, if the power distribution assembly 122 is in the first mode, then the second clutch 128 may be moved to the engaged position to change to park mode. Conversely, to move from park mode to the first mode, the second clutch 128 may be moved from the engaged position to the disengaged position.

To move from the second mode to the park mode, the first and second clutches 126, 128 may be moved from the disengaged position to the engaged position. Conversely, to move from the park mode to the second mode, the first and second clutches 126, 128 may be moved from the engaged position to the disengaged position.

To move from the third mode to the park mode, the first clutch 126 and the third clutch 130 may be moved from the disengaged position to the engaged position. Conversely, to move from the park mode to the third mode, the first and third clutches 126, 130 may be moved from the engaged position to the disengaged position.

Figure 6:
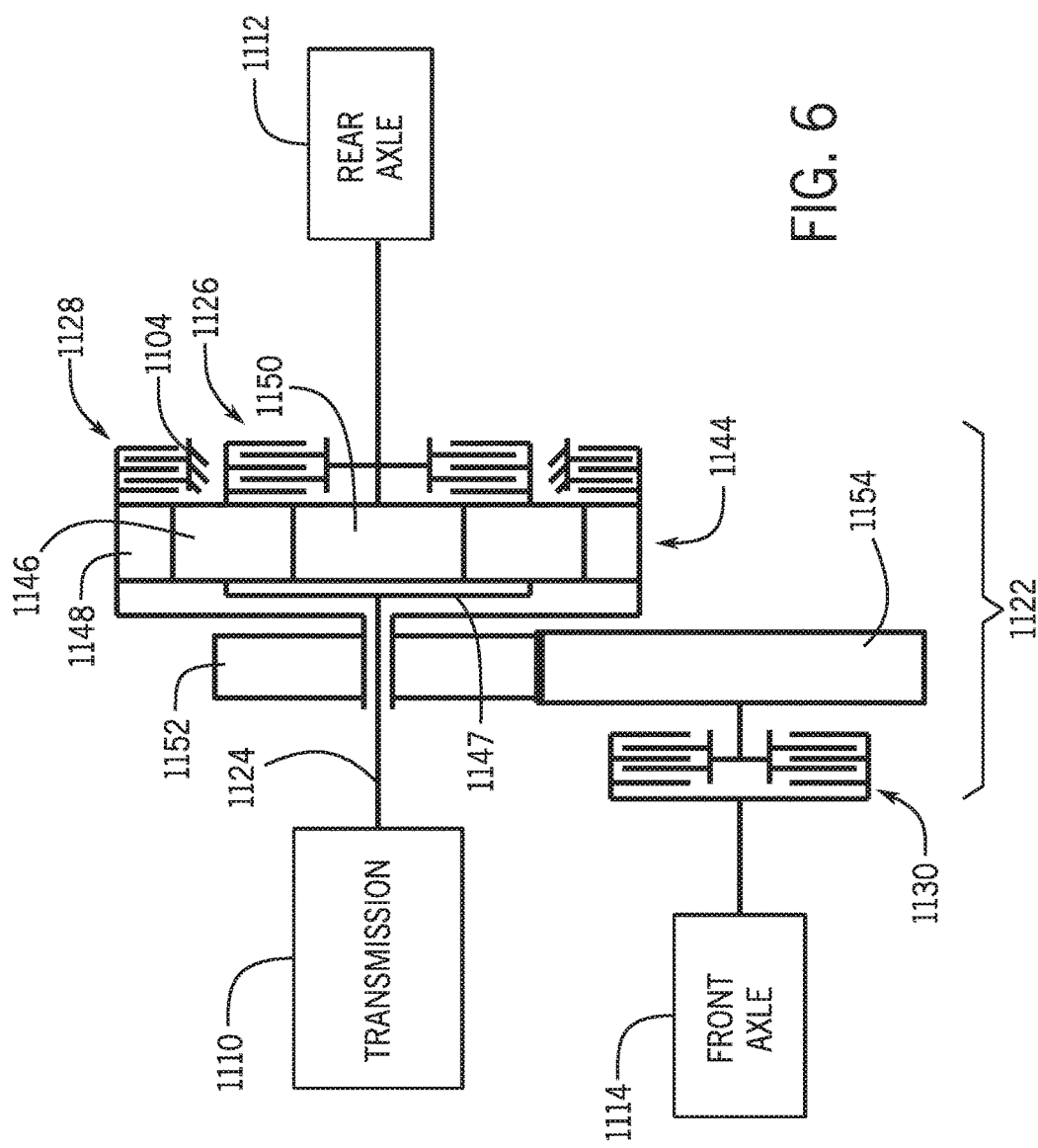
FIG. 6 is a schematic view of the power distribution assembly according to an additional example embodiment of the present disclosure.

Referring now to FIG. 6, additional embodiments of the power distribution assembly 1122 are illustrated. The power distribution assembly 1122 and other features of the vehicle may be substantially similar to those discussed above and those illustrated in FIGS. 2-5, except as noted below. Components that correspond with those of the embodiments of FIGS. 2-5 are indicated with corresponding reference numbers increased by 1000.

As shown, the planetary gearset 1144 may be different from the embodiments of FIGS. 2-5. Here, the rear axle 1112 may be fixedly attached for rotation with the sun gear 1150. Also, the front axle 1114 may be selectively coupled (via the third clutch 1130, the second intermediate gear 1154, and the first intermediate gear 1152) to the ring gear 1148 of the planetary gearset 1144. The transmission shaft 1124 may be fixed for rotation with the carrier 1147 and the planet gears 1146.

Also, the first clutch 1126 may selectively engage to fix the planet gears 1146 and carrier 1147 to the sun gear 1150. The first clutch 1126 may selectively disengage to release the planet gears 1146 and carrier 1147 from the sun gear 1150.

Furthermore, the second clutch 1128 may selectively engage to ground the ring gear 1148 to the chassis 1104. Conversely, the second clutch 1128 may selectively disengage to release the ring gear 1148 from the chassis 1104.

Moreover, the third clutch 1130 may selectively engage to transmit power between the front axle 1114 and the second intermediate gear 1154, which is enmeshed with the first intermediate gear 1152, and which is fixed for rotation with the ring gear 1148. Thus, the third clutch 1130 may selectively engage to couple the front axle 1114 and the ring gear 1148 for co-rotation. Conversely, the third clutch 1130 may selectively disengage to de-couple the front axle 1114 and the ring gear 1148 for independent rotation.

Figure 9:
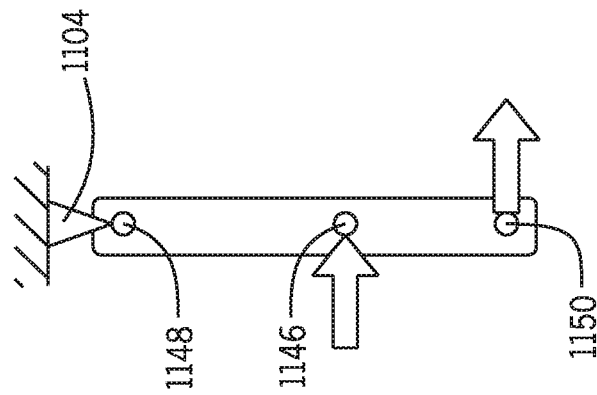
FIG. 9 is a schematic view representing power flow through the power distribution assembly of FIG. 6 in a third transmission mode.
Figure 8:
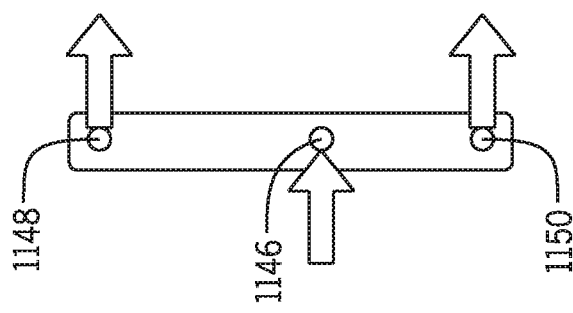
FIG. 8 is a schematic view representing power flow through the power distribution assembly of FIG. 6 in a second transmission mode.
Figure 7:
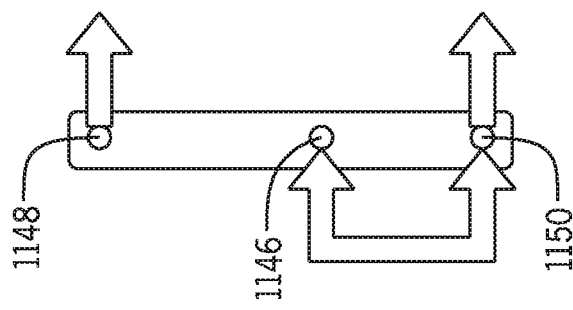
FIG. 7 is a schematic view representing power flow through the power distribution assembly of FIG. 6 in a first transmission mode.

FIGS. 7-9 may represent the planetary gearset 1144 in the different drive modes of the power distribution assembly 1122. The clutches 1126, 1128, 1130 may be arranged in the same clutch arrangements discussed above to achieve the different modes of the power distribution assembly 1122. In other words, the first clutch 1126 and third clutch 1130 may be engaged and the second clutch 1128 may be disengaged to achieve the first mode (e.g., a 4WD mode). Furthermore, the first and second clutches 1126, 1128 may be disengaged and the third clutch 1130 may be engaged to provide the second mode (e.g., an AWD mode). Additionally, the first and third clutches 1126, 1130 may be disengaged and the second clutch 1128 may be engaged to provide the third mode (e.g., an O/D mode). Additionally, the clutches 1126, 1128, 1130 may be biased toward the engaged mode, similar to the embodiments discussed above.

FIG. 7 may represent the planetary gearset 1144 in the first mode. Like the embodiments of FIGS. 2 and 3, the power distribution assembly 1122 may lock the rear and front axles 1112, 1114 together. Input power to the planet gears 1146 may pass to the ring gear 1148 and the sun gear 1150 and cause the rear and front axles 1112, 1114 to rotate at a substantially fixed speed ratio.

FIG. 8 may represent the planetary gearset 1144 in the second mode. As shown, power input to the planet gears 1146 may be split between the ring gear 1148 (for delivery to the front axle 1114) and the sun gear 1150 (for delivery to the rear axle 1112).

FIG. 9 may represent the planetary gearset 1144 in the third mode (e.g., an O/D mode), which may be substantially similar to the third mode discussed above with respect to FIGS. 2 and 5. As shown, the second clutch 1128 may lock the ring gear 1148 to the chassis 1104. Accordingly, power input to the planet gears 1146 may transmit to the rear axle 1112 via the sun gear 1150.

In summary, the power distribution assembly 122, 1122 of the present disclosure provide a number of modes (e.g., 4WD, AWD, O/D, and park modes) for use in a number of different scenarios. As such, the work vehicle may be useful and effective in a variety of conditions. Certain modes may provide high fuel efficiency for the work vehicle. Also, the assembly 122, 1122 may be configured in a relatively simple design with relatively few parts. This allows the assembly 122, 1122 to be relatively compact. Also, manufacturing costs may be relatively low because of the low part count. Furthermore, changing between certain modes may occur simply, for example, by changing the position of a single clutch. Accordingly, mode shifts may be smooth and imperceptible to the operator.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle comprising:
    a power plant that is configured to generate power for rotating a drive shaft;
    a first axle;
    a second axle; and
    a power distribution assembly having a plurality of modes, the power distribution assembly configured to selectively distribute power from the drive shaft between the first axle and the second axle in the plurality of modes, the power distribution assembly comprising:
        a plurality of clutches, each moveable between an engaged position and a disengaged position, the plurality of clutches including at least one clutch that is configured to change between the respective engaged position and the respective disengaged position to selectively change the power distribution assembly between the plurality of modes; and
        a planetary gearset including a first component, a second component, and a third component;
        wherein the plurality of modes includes a first mode, a second mode, and a third mode;
        wherein, in the first mode, power from the drive shaft is configured to be input to the first component and transferred to the second and third components for transmission to the first axle and the second axle, the first and second axles being fixed together for rotation at a fixed speed ratio in the first mode;
        wherein, in the second mode, power from the drive shaft is configured to be input to the first component and is divided between the second and third components for delivery to the first axle and the second axle, the first and second axles being configured for rotation at a varying speed ratio in the second mode; and
        wherein, in the third mode, power from the drive shaft is configured to be input via an input member to the first component, is output to the first axle via the second component, and is prevented from transferring to the second axle via the third component, an input speed of the input member being less than an output speed of the second axle.

2. The work vehicle of claim 1, wherein the plurality of clutches includes a first clutch, a second clutch, and a third clutch, each configured to move between the respective engaged position and the respective disengaged position;
    wherein the first clutch, in the engaged position, rotationally fixes the first and second components of the planetary gearset together;
    wherein the first clutch, in the disengaged position, releases the first and second components for independent rotation;
    wherein the second clutch, in the engaged position, grounds the third component of the planetary gearset to a chassis of the vehicle;
    wherein the second clutch, in the disengaged position, releases the third component from the chassis for rotation relative to the chassis;
    wherein the third clutch, in the engaged position, rotationally fixes the second axle to the third component of the planetary gearset; and
    wherein the third clutch, in the disengaged position, rotationally releases the second axle from the third component.

3. The work vehicle of claim 2, wherein the power distribution assembly further includes a park mode;

wherein the first, second, and third clutches are in the engaged position in the park mode.

4. The work vehicle of claim 3, wherein the first, second, and third clutches are biased toward the engaged position and away from the disengaged position.

5. The work vehicle of claim 2, wherein the planetary gearset is a single planetary gearset;
wherein the first component includes a plurality of planet gears attached by a carrier;
wherein the second component is a ring gear that is operably coupled to the first axle; and
wherein the third component is a sun gear that is operably coupled to the second axle.

6. The work vehicle of claim 2, wherein the planetary gearset is a single planetary gearset;
wherein the first component includes a plurality of planet gears attached by a carrier;
wherein the second component is a sun gear that is operably coupled to the first axle; and
wherein the third component is a ring gear that is operably coupled to the second axle.

7. The work vehicle of claim 2, wherein, in the first mode, the first and third clutches are in the engaged position and the second clutch is in the disengaged position, allowing power from the drive shaft to transmit to the first axle via the second component and to the second axle via the third component and the third clutch;
wherein, in the second mode, the first and second clutches are in the disengaged position and the third clutch is in the engaged position, allowing power from the drive shaft to be divided between the first axle and the second axle, wherein the power divided to the first axle is transmitted via the second component, and wherein the power divided to the second axle is transmitted via the third component.

8. The work vehicle of claim 1, further comprising a transmission that is operably connected to both the drive shaft and the first component of the planetary gearset;
wherein the transmission is configured to apply a predetermined gear ratio when transmitting power from the drive shaft to the input member of the power distribution assembly.

9. The work vehicle of claim 1, further comprising an intermediate geartrain;
wherein the intermediate geartrain includes a first gear that is fixed for rotation with the third component of the planetary gearset;
wherein the intermediate geartrain includes a second gear fixed for rotation with the second axle; and
wherein the intermediate geartrain is configured to apply a predetermined gear ratio to power transmitted from the third component to the second axle.

10. The work vehicle of claim 1, wherein the first axle is a rear axle of the work vehicle; and
wherein the second axle is a front axle of the work vehicle.

11. The work vehicle of claim 10, wherein the front axle is configured for steering the work vehicle.

12. The work vehicle of claim 1, wherein, in the first mode, the first axle and the second axle are fixed together for rotation at an unequal, fixed speed ratio.

13. The work vehicle of claim 1, wherein, in the second mode, the power distribution assembly biases torque toward the first axle.

14. The work vehicle of claim 1, wherein the plurality of clutches is configured such that only one of the plurality of clutches is changed between the respective engaged position and the respective disengaged position to change the power distribution assembly between the first and second modes.

15. A method of operating a multi-mode power distribution assembly that includes a plurality of clutches and a planetary gearset, the plurality of clutches being independently moveable between an engaged position and a disengaged position, the planetary gearset including a first component, a second component, and a third component, the method comprising:
changing the power distribution assembly between a first mode, a second mode, and a third mode by moving at least one of the plurality of clutches between the engaged position and the disengaged position;
operating the power distribution assembly in the first mode with power from a drive shaft being input to the first component and transferred to the second and third components for transmission to a first axle and a second axle, the first and second axles being fixed together for rotation at a fixed speed ratio in the first mode;
operating the power distribution assembly in the second mode with power from the drive shaft being input to the first component and divided between the second and third components for delivery to the first axle and the second axle, the first and second axles being configured for rotation at a varying speed ratio in the second mode; and
operating the power distribution assembly in the third mode with power from the drive shaft being input to an input member of the power distribution assembly for rotating the first component and being output to the first axle via the second component, the power from the drive shaft prevented from transferring to the second axle, an input speed of the input member being less than an output speed of the second axle in the third mode.

16. The method of claim 15, wherein the changing the power distribution assembly includes moving only one of the plurality of clutches to shift between the first mode and the second mode.

17. The method of claim 15, further comprising shifting the power distribution assembly to a park mode by moving each of the plurality of clutches to the engaged position.

18. The method of claim 17, wherein each of the plurality of clutches is biased toward the engaged position.

19. The method of claim 15, wherein the planetary gearset is a single planetary gearset;
wherein the first component includes a plurality of planet gears attached by a carrier;
wherein the second component is a ring gear that is operably coupled to the first axle; and
wherein the third component is a sun gear that is operably coupled to the second axle.

20. The method of claim 15, wherein the planetary gearset is a single planetary gearset;
wherein the first component includes a plurality of planet gears attached by a carrier;
wherein the second component is a sun gear that is operably coupled to the first axle; and
wherein the third component is a ring gear that is operably coupled to the second axle.

* * * * *